United States Patent
Schmid et al.

(10) Patent No.: US 6,447,625 B1
(45) Date of Patent: *Sep. 10, 2002

(54) METHOD AND DEVICE FOR BRINGING TOGETHER AND JOINING PLASTIC CARDS AND PRINTED CARD SUPPORTS

(75) Inventors: Eduard Schmid, Untermeitingen; Ulrich Erpenstein, Landsberg; Herbert Dassinger, Königsbrunn; Wolfgang Magg, Lagerlechfeld, all of (DE)

(73) Assignee: Bowe Systec AG, Augsburg (DE)

( * ) Notice: Subject to any disclaimer, the term of this patent is extended or adjusted under 35 U.S.C. 154(b) by 0 days.

This patent is subject to a terminal disclaimer.

(21) Appl. No.: 09/402,302

(22) PCT Filed: Mar. 24, 1998

(86) PCT No.: PCT/EP98/01737

§ 371 (c)(1),
(2), (4) Date: Dec. 7, 1999

(87) PCT Pub. No.: WO98/58340

PCT Pub. Date: Dec. 23, 1998

(30) Foreign Application Priority Data

Jun. 17, 1997 (DE) .......................................... 197 25 579

(51) Int. Cl.[7] .......................... B32B 31/00; B65B 61/02

(52) U.S. Cl. .................. 156/64; 156/277; 156/299; 53/131.2; 53/55; 53/411; 364/478.09

(58) Field of Search .......................... 156/64, 277, 297, 156/299, 362, 378, 387, 538, 539, 556; 53/411, 131.2, 55; 364/478.09

(56) References Cited

U.S. PATENT DOCUMENTS

| | | | |
|---|---|---|---|
| 4,429,217 A | | 1/1984 | Hill et al. .................... 235/380 |
| 5,058,873 A | * | 10/1991 | Hewitt et al. |
| 5,451,037 A | * | 9/1995 | Lundstrom |
| 5,715,653 A | * | 2/1998 | Weinmann et al. |
| 6,294,032 B1 | * | 9/2001 | Weinmann et al. ........... 156/64 |

FOREIGN PATENT DOCUMENTS

| | | |
|---|---|---|
| DE | 3049607 | 9/1983 |
| DE | 19508282 | 3/1996 |
| DE | 19533444 | 9/1996 |

* cited by examiner

*Primary Examiner*—Curtis Mayes
(74) *Attorney, Agent, or Firm*—Michael A. Glenn; Kirk D. Wong

(57) ABSTRACT

A method of bringing together and joining plastic cards, which are provided with an identification mark, and printed card carriers associated with the respective plastic cards, has the following steps: providing the plastic card, detecting the identification mark of said plastic card, deriving a test mark from said identification mark of the plastic card in such a way that unequivocal calculating back to the identification mark is not possible on the basis of the test mark, reading a data base by means of said identification mark, printing on the card carrier data read from the data base as well as the test mark, detecting the test mark of the card carrier prior to joining said card carrier to the plastic card, determining whether the test mark derived from the identification mark of the plastic card, which is about to be joined to the card carrier, corresponds to the detected test mark, and, provided that the test marks of the plastic card and of the card carrier correspond, bringing together and joining the plastic card and the card carrier.

9 Claims, 5 Drawing Sheets

METHOD AND DEVICE FOR BRINGING TOGETHER AND JOINING PLASTIC CARDS AND PRINTED CARD SUPPORTS

BACKGROUND OF THE INVENTION

1. Field of the Invention

The present invention refers to a method and an apparatus for bringing together and joining plastic cards, which are provided with an identification mark, and printed card carriers associated with the respective plastic cards.

2. Description of the Prior Art

It is generally possible to automatically join (apply) a variable number of plastic cards, such as thick plastic cards, type CR-80, to card carriers by means of known systems. The card carriers having applied thereto the plastic cards are then packed into envelopes, e.g. in an enveloping station, and either deposited in a scalelike mode of arrangement or subjected to further treatment, such as sorting or encircling by a plastic strip.

In a method and in an apparatus known from U.S. Pat. No. 4,429,217 presorted and personalized plastic cards are applied to presorted and personalized card carriers. The term "personalized" means in this connection that the plastic card and the card carrier, respectively, have already been provided with the necessary data, such as name, address etc.. The card carriers can in this case by supplied from a stack of continuous sheets or from a stack of single sheets.

In FIG. 5 such an apparatus for applying plastic cards and card carriers is shown. The apparatus is designated generally by reference numeral 500.

In this known apparatus, the plastic cards are contained in a turret means 502 comprising four magazines 504. Individual plastic cards 506 are discharged from the turret means 502 and supplied to a reader 508. The supply of the individual cards to the various stations takes place via so-called stop points 510 at which the cards stop until a signal arrives from a subsequent station which indicates that the subsequent station is ready to receive the card.

In the reader 508, an identification number (ID number) of the plastic card 506 is read. A processing means (VE) 512 detects and stores the identification number. Subsequently, the plastic card 506 is guided to an application means 514 via a plurality of stop points 510. Prior to supplying the plastic card 506 to the application means 514, the plastic card may be provided with a gummed label at a station 516 so as to guarantee the subsequent connection to the card carrier.

The card carrier is supplied from a second direction (arrow 518), which does not correspond to the direction in which the plastic card 506 is supplied to the application means 514.

The card carrier is contained in a stack 520 comprising the card carriers in a presorted form. As has been described hereinbefore, the card carriers have already been provided with the relevant data, such as the name and the address of the person receiving the card.

From the stack 520, the card carrier is supplied to a reader 522, which will read an identification number printed on the card carrier. This identification number is compared (arrow 524) with the identification number of the card occupying the last stop point prior to the application means 514. If the identification numbers correspond, the plastic card and the card carrier will be connected.

In this known apparatus 500, all components are controlled by the same system clock, i.e. the number of strokes elapsing until a plastic card reaches the application means 514 after the reading of the identification number at 508 is known, so that, depending on this known transit time, the supply of the card carriers from the stack 520 and the examination of the identification numbers can be controlled such that the card carrier will arrive at the application means 514 at the same time as the plastic card 506 belonging to this card carrier.

One disadvantage of this known apparatus is to be seen in the fact that the plastic cards as well as the card carriers must be presorted and that, in addition, the card carriers must already be personalized. This results in a substantial restriction of the flexibility of such an apparatus.

DE 195 08 282 C1 discloses a method and an apparatus for bringing together and joining plastic cards, which are provided with an identification mark, and printed card carriers associated with the respective plastic cards. The correct association of the card and of the carrier is achieved by a print job number which is associated with a plastic card and printed on a card carrier. Before the card and the carrier are joined, it is examined whether the print job number of the plastic card, which is about to be joined to the card carrier, corresponds to a print job number of a carrier which is about to be joined.

SUMMARY OF THE INVENTION

It is the object of the present invention to provide a simplified method and a simplified apparatus for bringing together and joining plastic cards and card carriers, the method and the apparatus permitting a correct association of the card and of the carrier and showing an improved flexibility.

The present invention is a method of bringing together and joining plastic cards, which are provided with an identification mark, and printed card carriers associated with the respective plastic cards, by providing the plastic card, detecting the identification mark of the plastic card, deriving a test mark from the identification mark of the plastic card in such a way that unequivocal calculating back to the identification mark is not possible on the basis of the test mark, reading a data base by means of the identification mark, printing on the card carrier data read from the data base as well as the test mark, detecting the test mark of the card carrier prior to joining the card carrier to the plastic card, determining whether the test mark derived from the identification mark of the plastic card, which is about to be joined to the card carrier, corresponds to the detected test mark, provided that the test marks of the plastic card and of the card carrier correspond, bringing together and joining the plastic card and the card carrier.

The present invention is an apparatus for bringing together and joining plastic cards, which are provided with an identification mark, and printed card carriers associated with the respective plastic cards, having a carrier means containing the plastic cards, means for detecting the identification mark of the plastic card and for deriving a test mark from the identification mark of the plastic card in such a way that unequivocal calculating back to the identification mark is not possible on the basis of the test mark, a data base means containing data depending on the identification mark, a printer which prints onto the card carrier the data read from the data base means as well as the test mark, a means used for detecting the test mark of the card carrier and for comparing the test mark derived from the identification mark of the plastic card, which is about to be joined to the card carrier, with the test mark of the card carrier, and a bringing-together and joining means used for bringing together and joining the plastic card and the card carrier, provided that the test marks of the plastic card and of the card carrier correspond.

In accordance with one aspect, the invention is a system system, which is used for bringing together and joining plastic cards provided with an identification mark and printed card carriers associated with the respective plastic cards and which is used for packing the plastic cards having applied thereto the card carriers, having a tower of cards comprising the plastic cards, a temporary store for temporarily storing the plastic cards received from the tower of cards, a processing means which detects the identification mark of the plastic card and which derives a test mark from the identification mark of the plastic card in such a way that unequivocal calculating back to the identification mark is not possible on the basis of the test mark, a data base from which data can be read depending on the identification mark, a single-sheet printer connected to the processing means, the single-sheet printer printing the card carrier on the basis of the data received from the processing means and providing the card carrier with the test mark, a transfer means receiving the card carrier discharged from the single-sheet printer, a temporary paper store provided with a single-sheet feed means, a transverse folding means, and a single-sheet discharge means and receiving the card carrier from the transfer means, a reader which detects the test mark of the card carrier and transfers it to the processing means and which determines whether the transmitted test mark of the card carrier corresponds to the test mark derived from the identification mark of the plastic card, which is about to be joined to the card carrier, an application means which is connected to the processing means and which is used for bringing together and joining the plastic card, which comes from the temporary store, and the card carrier, the application means discharging the card carrier with the plastic card, if the test marks of the plastic card and of the card carrier correspond, and a device for packing the plastic card having applied thereto the card carrier.

In accordance with another aspect, the invention is a system which is used for bringing together and joining plastic cards provided with an identification mark and printed card carriers associated with the respective plastic cards and which is used for packing the plastic cards having applied thereto the card carriers, having a tower of cards comprising the plastic cards, a temporary store for temporarily storing the plastic cards received from the tower of cards, a processing means, which detects the identification mark of the plastic card and which derives a test mark from the identification mark of the plastic card in such a way that unequivocal calculating back to the identification mark is not possible on the basis of the test mark, a data base from which the data can be read depending on the identification mark, a continuous-paper printer connected to the processing means, the continuous-paper printer printing the card carrier on the basis of the data received from the processing means and providing the card carrier with the test mark, loop-type temporary store which arranged in spaced relationship with the continuous-paper printer, a cutting machine which separates the continuous paper, a reader which detects the test mark of the card carrier and transfers it to the processing means and which determines whether the transmitted test mark of the card carrier corresponds to the test mark derived from the identification mark of the plastic card, which is about to be joined to the card carrier, a transverse folding means which receives the separated paper, an application means which is connected to the processing means and which is used for bringing together and joining the plastic card, which comes from the temporary store, and the card carrier, the application means discharging the card carrier with the plastic card, if the test marks of the plastic card and of the card carrier correspond, and a device for packing the plastic card having applied thereto the card carrier.

In accordance with yet another aspect, the invention is a system which is used for bringing together and joining plastic cards provided with an identification mark and printed card carriers associated with the respective plastic cards and which is used for packing the plastic cards having applied thereto the card carriers, having a tower of cards comprising the plastic cards, a processing means which detects the identification mark of the plastic card and which derives a test mark from the identification mark of the plastic card in such a way that unequivocal calculating back to the identification mark is not possible on the basis of the test mark, a data base from which data can be read depending on the identification mark, a feed device containing non-personalized paper sheets which have already been preprinted, a first rerouting means fed by the feed device, an ink-jet printing unit which receives the preprinted, non-personalized paper sheets from the first rerouting means and which prints the card carrier on the basis of the data received from the processing means and provides the card carrier with the test mark, a second rerouting means receiving the printed card carriers, a transverse folding means, a reader which detects the test mark of the card carrier and transfers it to the processing means and which determines whether the transmitted test mark of the card carrier corresponds to the test mark derived from the identification mark of the plastic card, which is about to be joined to the card carrier, an application means which is connected to the processing means and which is used for bringing together and joining the plastic card and the card carrier, the application means discharging the card carrier with the plastic card, if the test marks of the plastic card and of the card carrier correspond, and a device for packing the plastic card having applied thereto the card carrier.

One advantage of the present invention is to be seen in the fact that the test mark, instead of the print job number or the identification number, is used on the card carrier. This results in an improvement of data protection, since unequivocal calculating back to the identification mark is not possible on the basis of the test mark. Due to the use of the test mark, the identification number, which is used for accessing e.g. the data base for inquiring e.g. personal data, no longer appears on the card carrier and remains thus unknown to third parties —the plastic card has applied thereto the identification number invisibly, e.g. in a magnetic strip or the like. It follows that the access to personal data of a person, e.g. by unauthorized access to the data base by third persons, can be prevented more reliably in accordance with the present invention.

BRIEF DESCRIPTION OF THE DRAWINGS

In the following, preferred embodiments of the present invention will be described in detail making reference to the drawings enclosed, in which.

DESCRIPTION OF THE PREFERRED EMBODIMENTS

Figure 1:
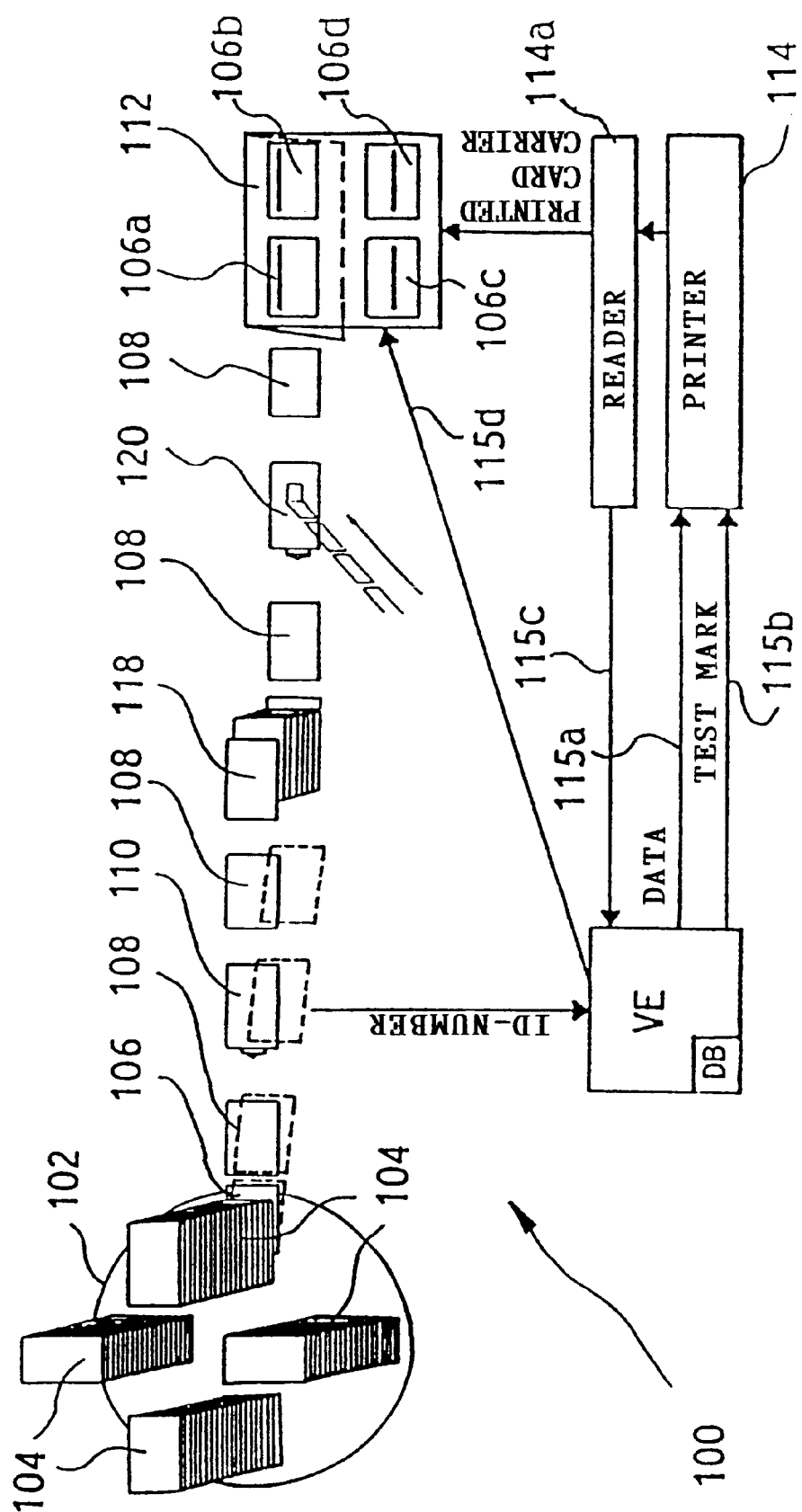
FIG. 1 shows a general representation of an apparatus for bringing together and joining plastic cards and card carriers according to the present invention, which is adapted to be used for carrying out the method according to the present invention.

FIG. 1 shows an apparatus according to the present invention used for bringing together and joining plastic cards, which are provided with an identification mark, and printed card carriers associated with the respective plastic cards. The apparatus according to the present invention is designated generally by reference numeral 100.

The apparatus 100 comprises a carrier means 102, which, in this embodiment, is constructed as a turret. The turret 102 comprises four magazines 104, which each contain plastic cards 106. These cards have already been personalized, but their mode of arrangement in the magazines 104 is unsorted (chaotic). Via so-called stop points 108, a card 106 reaches an detection station 110. The movement of the cards 106 in the apparatus 100 takes place in a manner which is known per se to those skilled in the art.

The card 106 is moved to an application means 112 via the stop points 108, the application means 112 bringing together and joining the card 106 and a card carrier. The detection station 110 is connected to a processing means VE having associated therewith a data base DB. The application means 112 is connected to a printer 114 via a reader 114a. The printer 114 is connected to the processing means VE by a plurality of data lines 115a, 115b. The reader 114a is connected to the processing means VE by a data line 115c.

In the following, the mode of operation of the apparatus 100 according to the present invention will be described in detail on the basis of FIG. 1.

The carrier means 102 provides a plastic card 106 from one of its magazines, the plastic card 106 being then moved to the detection station 110. The detection station detects the identification number of the plastic card in connection with the processing means VE and derives a test mark from the identification mark of the plastic card 106 in such a way that unequivocal calculating back to the identification mark is not possible on the basis of the test mark. The derivation of the test mark will be described in more detail in the following. The processing means VE reads the data base DB by means of the identification mark and transmits the data to the printer 114 via the data line 115a. Furthermore, the processing means VE transmits the test mark to the printer via the data line 115b. The printer 114 prints onto a card carrier the data read from the data base as well as the test mark received. While the card carrier is being printed by the printer, the plastic card 106 moves from the detection station 110 towards the application means 112. When it has reached the last stop point 108 prior to the application means 112, the printed card carrier will be transferred from the printer to the reader 114a. The reader 114a reads the test mark printed on the card carrier and transmits the test mark via the data line 115c to the processing means VE, which determines whether the test mark of the card carrier corresponds to the test mark derived from the identification mark of the plastic card 106 occupying the stop point 108 immediately prior to the application means 112. If the test marks correspond, the processing means VE will output a signal via a data line 115d, which has the effect that the application means 112 will bring the plastic card 106 and the card carrier together and join them.

In the following, it will be described in detail how the test mark is derived from the identification mark of the card 106.

According to one embodiment, the test mark is formed from individual elements or parts of the identification mark by combining predetermined parts or elements which will then form the test mark. The test mark will be a mark whose information content is reduced in comparison with that of the identification mark of the card, i.e. the test mark is produced from the identification mark under loss of information.

According to a further embodiment, the test mark is obtained by forming the test sum from the identification mark of the card. There are different methods for forming the test sum, the XOR test sum formation method (XOR= exclusive OR operation), which is one of these methods, being described in detail in the following.

Assuming that the identification mark exists in the form of a number having a plurality of digits. In this method, the respective test sum is formed via a predetermined number of digits of the identification mark. As an example, the identification mark is assumed to exist in hexadecimal form. The test sum is formed by an XOR operation interconnecting predetermined digits of the identification mark so that a test sum with a plurality of digits is obtained.

EXAMPLE

IDENTIFICATION MARK (hex)=01 02 FE 08 07 09
(the underlined digits are interconnected)
Formation of the test sum by:
   XORing of 01 with 02=03
   XORing of FE with 08=F6
   XORing of 07 with 09=0E
Result: TEST SUM=03 F6 0E If the identification mark has an uneven number of digits, the test sum can be completed by adding a fill value.

This number—test sum—is used in the system instead of the original number—identification mark of the card—e.g. as an OCR information (OCR=optical character recognition). When the test sum is formed, a return to the original number, i.e. the identification mark of the card, is no longer possible.

Reference is made to the fact that the present invention is not limited to hexadecimal representations of the identification mark, but the identification mark can also exist in other representations, e.g. binary, decimal, etc. In addition, the present invention is not limited to XOR operations. It is also possible to use AND, OR, NAND or NOR operations.

It should be pointed out that, with the exception of the printer, all other components of the apparatus 100 according to the present invention are subjected to the system clock. For this reason, a renewed detection of the test mark of the plastic card at the stop point 108 immediately prior to the application means 112 is not necessary, since the period of time, i.e. the number of strokes, which a card 106 needs for travelling from the detection station 110 to the application means 112 is/are known to the processing means VE.

The special configuration of the apparatus decisively depends on the type of printer used. In order to avoid time losses caused by the distance which the card carriers have to travel from the printing mechanism of the printer 114 to the application means 112, a number of read cards corresponding at least to the number of card carriers between the detection station 110 and the application means 112 is stored temporarily. The structural design of the temporary store 118 can, for example, be of such a nature that the temporary store is able to hold 20 to 80, preferably about 50 plastic cards.

In the embodiment shown in FIG. 1, a labeller 120 is additionally provided, the labeller applying a gummed label to the plastic card 106 before the plastic card reaches the application means 112 so that the plastic card can reliably be fastened to the card carrier.

Although, up to now, it has only been described how one plastic card 106 and one card carrier are brought together and joined, it is obvious that the present invention is not limited to the fastening of only one plastic card to one card carrier. In FIG. 1, an application means 112 is shown with the aid of which up to four plastic cards 106*a–d* can selectively be brought together with and joined to a single card carrier.

Figure 2:
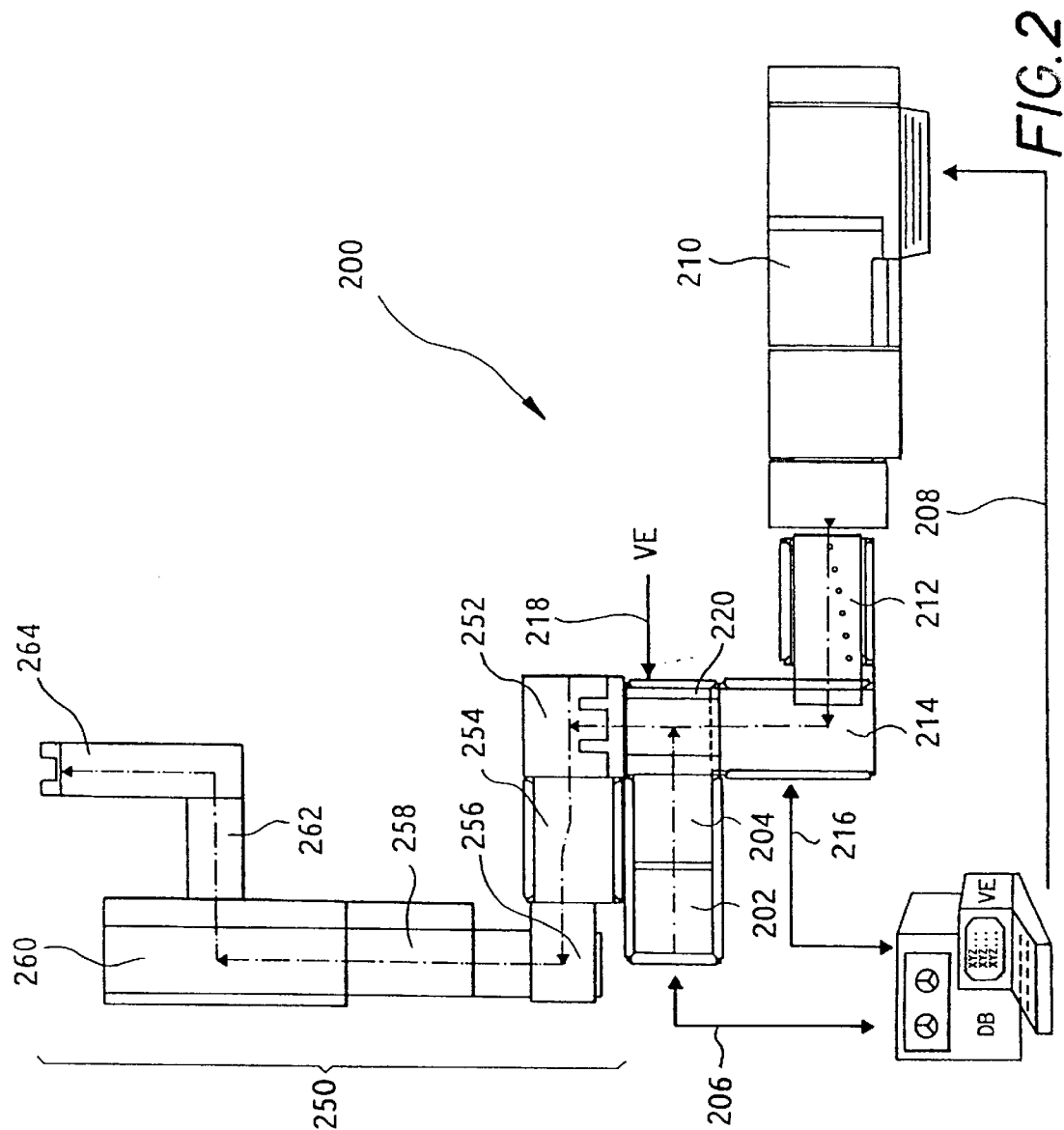
FIG. 2 shows a first embodiment of the apparatus for bringing together and joining plastic cards and card carriers according to the present invention.
Figure 3:
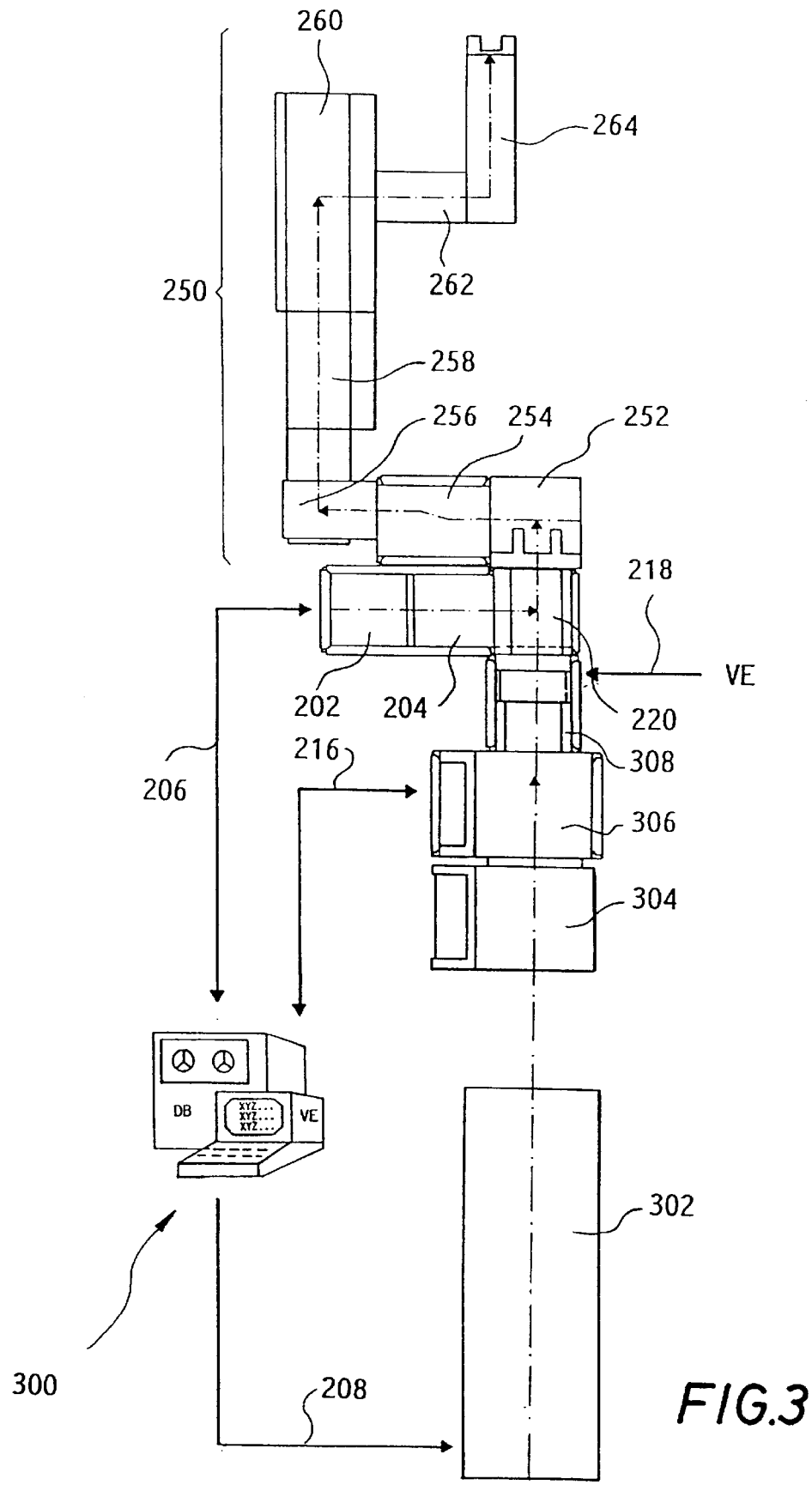
FIG. 3 shows a second embodiment of the apparatus for bringing together and joining plastic cards and card carriers according to the present invention.
Figure 4:
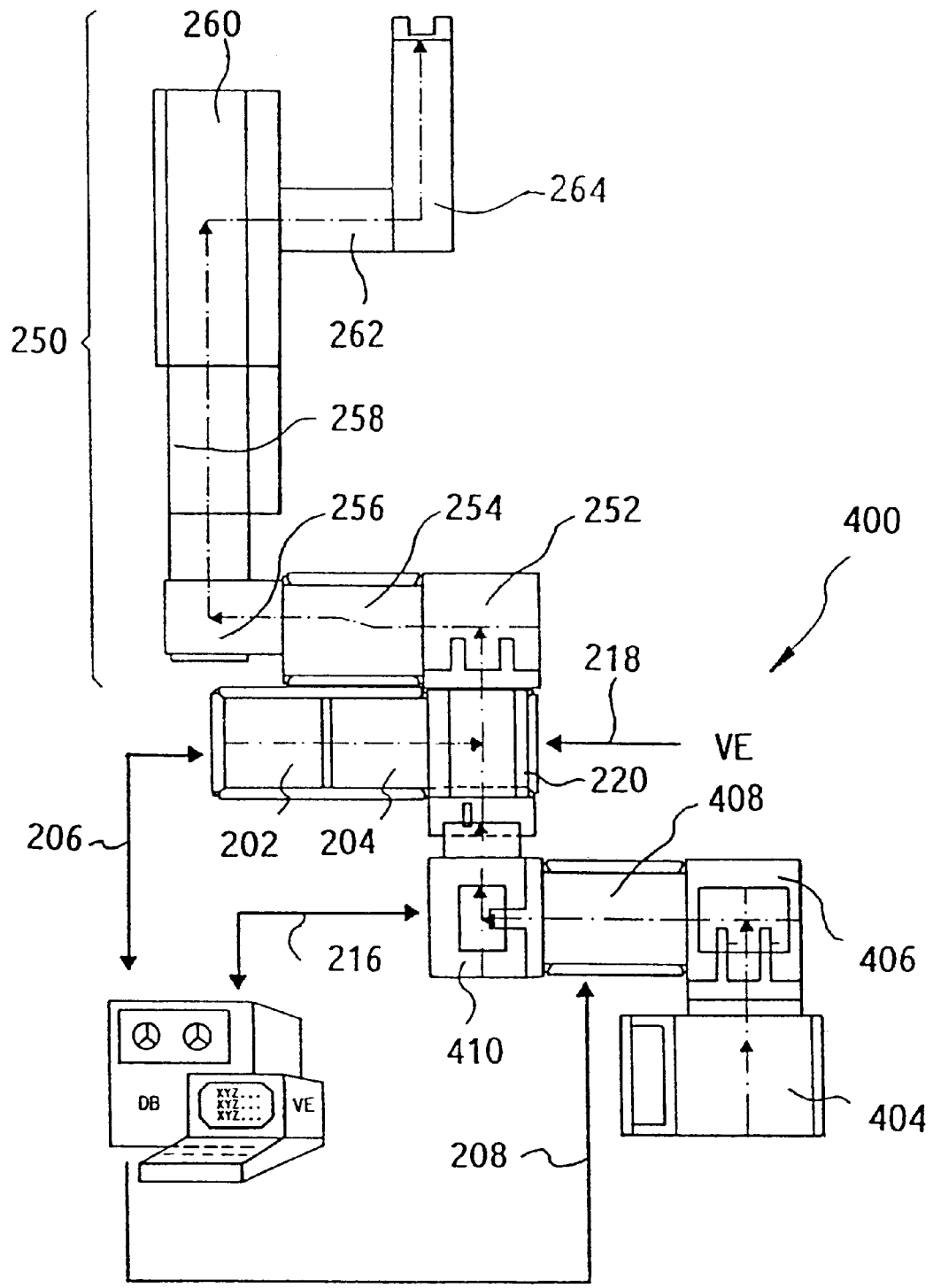
FIG. 4 shows a third embodiment of the apparatus for bringing together and joining plastic cards and card carriers according to the present invention.
Figure 5:
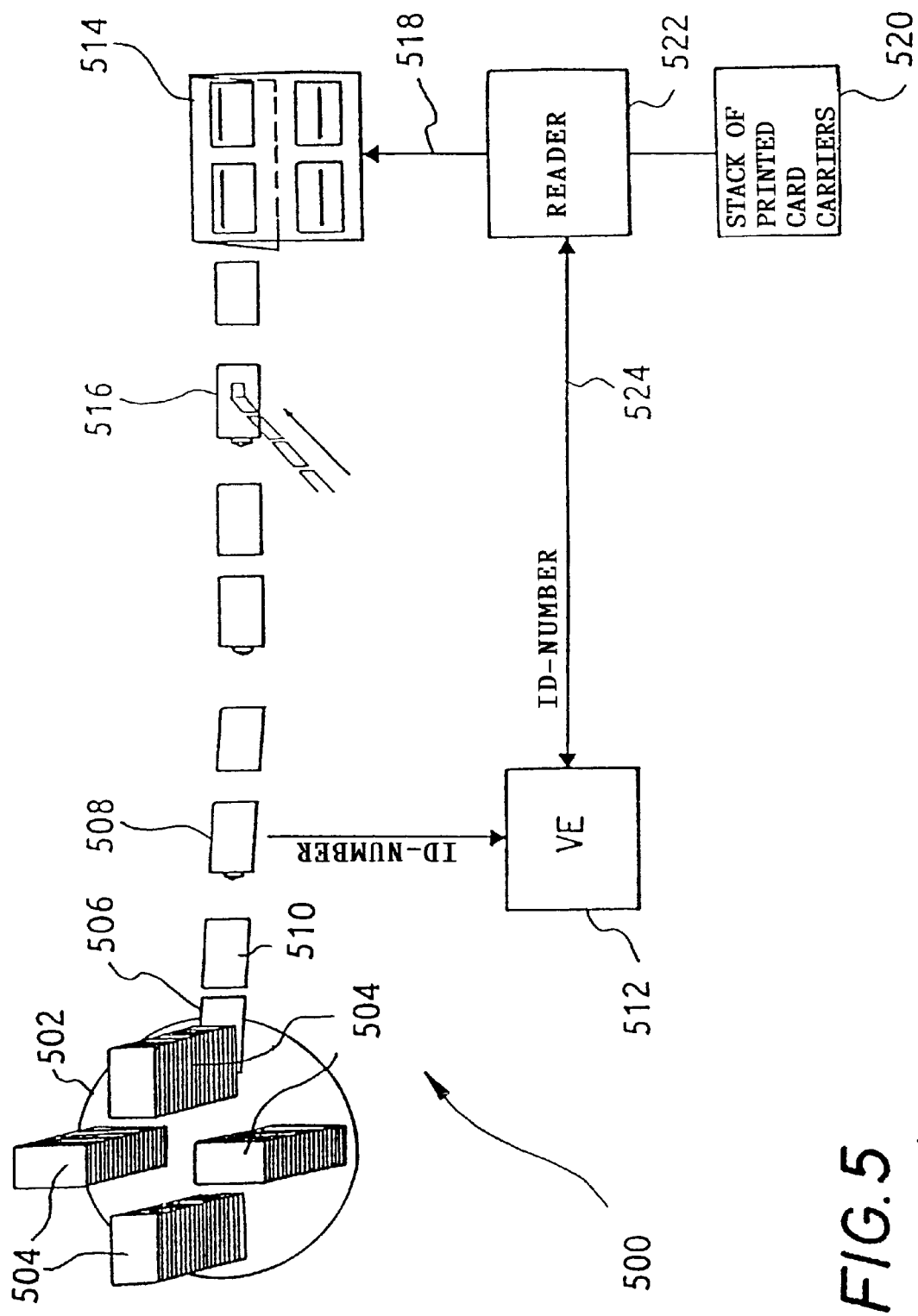
FIG. 5 shows an apparatus according to the prior art carrying out a method according to the prior art.

On the basis of FIGS. 2 to 5, preferred embodiments of systems will be described hereinbelow, which bring together and join plastic cards provided with an identification mark and printed card carriers associated with the respective plastic cards and which pack the plastic cards having applied thereto the card carriers. In FIGS. 2 to 4, like reference numerals have been used throughout to designate identical components.

FIG. 2 shows a system 200, which is provided with a tower 202 of cards comprising the plastic cards. The tower 202 of cards is followed by a reader 204 including a temporary store. Via a data line 206, a processing means VE detects the identification mark of the plastic card, which was read by the reader 204. The processing means VE includes a data base DB from which data can be read in response to the identification mark detected. The processing means VE derives the test mark from the identification mark of the plastic card 106 in such a way that unequivocal calculating back to the identification mark is not possible on the basis of the test mark. Via an additional data line 208, the processing means VE is connected to a single-sheet printer 210.

The single-sheet printer 210 receives via the data line 208 the data read from the data base DB as well as the test mark. The single-sheet printer 210 prints onto the card carrier the data received from the processing means VE as well as the test mark. The individual sheets, which have been printed by means of the single-sheet printer 210, are received by a transfer means 212 which transfers the individual sheets to a temporary paper store 214. The temporary paper store is provided with a single-sheet feed means and a single-sheet discharge means. The temporary paper store includes at the output thereof a reader (not shown) which is connected to the processing means VE via a data line 216.

The reader reads the test mark of the card carrier and transmits the test mark to the processing means VE via the data line 216. The processing means VE determines whether the transmitted test mark of the card carrier corresponds to the test mark derived from the identification mark of the plastic card which is about to be joined to this card carrier. The processing means VE is connected via a data line 218 to an application means 220. If the processing means VE determines that the test marks of the plastic card and of the card carrier correspond, it will supply via the line 218 a signal to the application means, which will bring together and join the plastic card coming from the means 204 and the card carrier coming from the means 214. Subsequently, the application means discharges the card carrier with the plastic card to a packing means, which is designated generally by reference numeral 250.

The packing means 250 includes a rerouting means 252, which receives the card carrier with the plastic card discharged by the application means 220. The means 252 transfers the card carrier with the plastic card to a longitudinal folding means, which, in turn, supplies them to a collector station 256. Via a collecting path 258, the card carrier with the plastic card reach a packing and closing means 260. From the packing and closing means 260, they are removed with the aid of a removal means 262, whereupon they are deposited in a scaled band 264 in a scalelike mode of arrangement.

FIG. 3 shows an additional embodiment of a system 300, which is used for bringing together and joining plastic cards provided with an identification number and printed card carriers associated with the respective plastic cards and which is used for packing the plastic cards having applied thereto the card carriers. This system is designated generally by reference numeral 300. Like reference numerals have been used to designate components which correspond to the components shown in FIG. 2. These components will not be described again.

This system 300 differs from the system according to FIG. 2 insofar as a continuous-paper printer 302 is used instead of a single-sheet printer. A loop-type temporary store 304, which temporarily stores the continuous paper in a loop like mode of arrangement, is arranged in spaced relationship with the continuous-paper printer 302. A loop of paper forms between the loop-type temporary store and the continuous-paper printer 302. Said loop-type temporary store 304 is followed by a cutting machine 306 which separates the continuous paper. Also the cutting machine has associated therewith a reader, which is connected to the processing means VE via the data line 216. This has already been described with reference to FIG. 2. Between the cutting means 306 and the application means 220, a transverse folding means 308 is arranged, which receives the separated paper from the cutting machine 306, provides it with a transverse fold and discharges it to the application means 220.

Also FIG. 4 shows an additional embodiment of a system, which is used for bringing together and joining plastic cards provided with an identification mark and printed card carriers associated with the respective plastic cards and which is used for packing the plastic cards having applied thereto the card carriers. This system is designated generally by reference numeral 400, and like reference numerals have been used for designating components corresponding to the components which have been described on the basis of FIG. 2. These components will not be described again.

Said system 400 differs from the preceding systems 200, 300 insofar as no temporary store is provided, but only a reader 204, which is positioned at the input of the application means 220. In the following, it will be described for which reasons the temporary store can be dispensed with in the case of this embodiment. The system 400 includes a feed device 404 containing non-personalized paper sheets which have already been preprinted, i.e. these paper sheets have already printed thereon e.g. preformulated letter texts etc. so that it will only be necessary to insert the personal data. The feed device 404 feeds an ink-jet printer 408 via a first rerouting means 406. The ink-jet printer 408 inserts the necessary data in the preprinted paper sheets, the data being e.g. name, address, etc., and the test mark, the data and the test mark being supplied from the processing means VE via the data line 208 to the ink-jet printer 408 in the manner which has already been described hereinbefore. Via a second rerouting means 410, the card carrier can be supplied to the application means 220. The second rerouting means 410 can also comprise a reader (not shown) which detects the test mark in the manner which has already been described hereinbefore. The reason for the fact that a temporary store can be dispensed with in this embodiment is that the printer only has to print the test mark as well as the name, address etc. onto the card carrier which is already present in the apparatus. The number of card carriers in the apparatus does not exceed the number of plastic cards after the detection station and before the application means. Hence, it is not necessary to store the plastic cards intermediately.

Deviating from the above-described embodiment, the reader can also be provided at the output of the ink-jet printer.

The above description of preferred embodiments of the present invention referred to a so-called "online" system in which the data base was accessed by means of the identification number and in which the test mark was produced in the processing means and outputted to the printer together with the data. The term "online" describes in this context the connection of the data base and of the printer according to the embodiments described hereinbefore.

In addition to this "online" operation, the printer can, however, also be operated independently of the data base and of the processing means, i.e. the printer and the rest of the system can be implemented separately from one another so that, other than in the case of the system of the bringing-together and joining means 112 which is shown in FIG. 1, the card carrier is supplied from a stack of preprinted card carriers. In this case, the forms and card carriers, respectively, are first printed and provided with the test mark. The algorithm for producing the test mark is known and the necessary data are taken from a data base, which is arranged separately from the rest of the system, and applied to the card carriers via a printer. The thus printed card carriers are transferred to a suitable device for supply to the bringing-together and joining means 112, a reader being provided between the stacking means and the means 112; the reader reads the test mark on the card carrier to be supplied to the bringing-together and joining means 112 and compares the test mark with the test mark derived from the identification mark of the plastic card. If these test marks correspond, the card and the card carrier will be brought together and joined.

What is claimed is:

1. A method of bringing together and joining plastic cards, which are provided with an identification mark, and printed card carriers associated with the respective plastic cards, comprising the following steps:

a) providing the plastic card;

b) detecting the identification mark of said plastic card;

c) deriving a test mark from said identification mark of the plastic card in such a way that unequivocal calculating back to the identification mark is not possible on the basis of the test mark;

d) reading a data base by means of said identification mark;

e) printing on the card carrier data read from the data base as well as the test mark;

f) detecting the test mark of the card carrier prior to joining said card carrier to the plastic card;

g) determining whether the test mark derived from the identification mark of the plastic card, which is about to be joined to the card carrier, corresponds to the test mark detected in step f); and, h) provided that the test marks of the plastic card and of the card carrier correspond, bringing together and joining the plastic card and the card carrier.

2. A method according to claim 1, wherein the test mark is derived from the identification mark under loss of information.

3. A method according to claim 1, wherein step c) comprises the formation of a test sum from the identification mark.

4. A method according to claim 3, wherein the identification mark is a number with a plurality of digits; and by logically interconnecting a predetermined number of digits the test sum is formed in such a way that said test sum has a plurality of digits.

5. A method according to claim 4, wherein the identification mark exists in hexadecimal form.

6. A method according to claim 4, wherein the logical operation comprises an AND, OR, NAND, NOR or XOR (exclusive OR) operation.

7. A method according to claim 1, comprising the following step after step b)

storing the plastic cards temporarily.

8. A method according to claim 1, comprising the following step carried out prior to step h)

applying a gummed label to the plastic card.

9. A method according to claim 1, wherein a plurality of plastic cards is brought together with and joined to a card carrier.

* * * * *